US012686255B2

(12) United States Patent
Voss et al.

(10) Patent No.: US 12,686,255 B2
(45) Date of Patent: Jul. 21, 2026

(54) PRESSURE LEVER LOCK

(71) Applicant: RSI North America, Inc., Dayton, NV (US)

(72) Inventors: Michael Voss, Aledo, TX (US); Marius Dreyer, Fort Worth, TX (US); Trevor Halstead, Durban (ZA)

(73) Assignee: RSI North America, Inc., Fort Worth, TX (US)

( * ) Notice: Subject to any disclaimer, the term of this patent is extended or adjusted under 35 U.S.C. 154(b) by 315 days.

(21) Appl. No.: 17/703,306

(22) Filed: Mar. 24, 2022

(65) Prior Publication Data

US 2023/0035602 A1     Feb. 2, 2023

(30) Foreign Application Priority Data

Jul. 30, 2021     (ZA) ................................. 2021/05415

(51) Int. Cl.
| | |
|---|---|
| *E05B 13/10* | (2006.01) |
| *B60J 7/185* | (2006.01) |
| *E05B 81/20* | (2014.01) |
| *E05C 3/04* | (2006.01) |

(52) U.S. Cl.
CPC ............. *B60J 7/1853* (2013.01); *E05B 81/20* (2013.01)

(58) Field of Classification Search
CPC ... Y10T 292/108; Y10T 292/216; E05B 5/00; Y10S 292/31
USPC ................................................... 70/208, 210
See application file for complete search history.

(56) References Cited

U.S. PATENT DOCUMENTS

| | | | | |
|---|---|---|---|---|
| 1,424,277 A | * | 8/1922 | Brown .................... | F16B 39/36 |
| | | | | 411/197 |
| 3,448,466 A | * | 6/1969 | Haldopoulos ........... | F16B 37/00 |
| | | | | 4/417 |
| 3,548,704 A | * | 12/1970 | Kutryk .................... | F16B 37/14 |
| | | | | 411/927 |
| 4,134,281 A | * | 1/1979 | Pelcin .................... | E05B 13/10 |
| | | | | 292/DIG. 31 |
| 4,195,867 A | * | 4/1980 | Baillie ...................... | E05C 1/10 |
| | | | | 70/81 |
| 4,413,849 A | * | 11/1983 | Davis ...................... | E05C 3/048 |
| | | | | 292/229 |

(Continued)

OTHER PUBLICATIONS

International Preliminary Report on Patentability of PCT/US2022/038518 dated Jan. 18, 2024.

(Continued)

*Primary Examiner* — Carlos Lugo
(74) *Attorney, Agent, or Firm* — K&L Gates LLP

(57)     ABSTRACT

A lock includes an internal facing portion and an external facing portion, a lever assembly, a housing cover on the external facing portion of the lock including a lock assembly having a locked position and a unlocked position and a button cap. The button cap extends into a first groove of the housing cover and engages a silicon sleeve sealing the button cap and the housing cover. A housing includes a trigger button and an inner seal to engage a second groove sealing the housing and the housing cover, and an anchoring frame on the internal facing portion of the lock coupled to the housing. The trigger button extends through the anchoring frame, and the trigger button is accessible from the internal facing portion of the lock to releasably actuate the lock assembly.

14 Claims, 20 Drawing Sheets

(56)                  References Cited

U.S. PATENT DOCUMENTS

| | | | | |
|---|---|---|---|---|
| 4,582,462 | A * | 4/1986 | Thiel | F16B 37/14 |
| | | | | 411/372.5 |
| 4,693,503 | A * | 9/1987 | Bisbing | E05B 17/0025 |
| | | | | 292/DIG. 60 |
| 5,137,312 | A * | 8/1992 | Tang | E05B 81/25 |
| | | | | 292/201 |
| 5,267,762 | A * | 12/1993 | Gromotka | E05B 13/002 |
| | | | | 292/DIG. 31 |
| 5,352,004 | A * | 10/1994 | Nedbal | E05B 77/34 |
| | | | | 292/DIG. 31 |
| 5,810,531 | A * | 9/1998 | Tershay | F16B 23/0092 |
| | | | | 411/429 |
| 5,927,773 | A * | 7/1999 | Larsen | E05C 1/145 |
| | | | | 292/DIG. 31 |
| 6,182,483 | B1 * | 2/2001 | von Kathen | E05B 13/002 |
| | | | | 292/336.3 |
| 6,606,889 | B1 * | 8/2003 | Tweedy | E05B 13/002 |
| | | | | 292/DIG. 31 |
| 6,913,297 | B2 * | 7/2005 | Jackson | E05B 1/0092 |
| | | | | 292/DIG. 31 |
| 8,857,230 | B1 | 10/2014 | Misner et al. | |
| 9,115,510 | B2 * | 8/2015 | Le | E05B 17/002 |
| 10,450,778 | B2 * | 10/2019 | Bennett | G07C 1/32 |
| 10,676,971 | B2 * | 6/2020 | Do | E05B 41/00 |
| D924,120 | S | 7/2021 | Voss | |
| 11,111,705 | B2 * | 9/2021 | Lipson | E05B 15/0205 |
| D961,492 | S | 8/2022 | Voss | |
| 2014/0333074 | A1 * | 11/2014 | Wollacott | E05B 5/00 |
| | | | | 292/202 |
| 2016/0002958 | A1 | 1/2016 | Liu | |
| 2021/0010291 | A1 | 1/2021 | Manly et al. | |

OTHER PUBLICATIONS

RSi SmartCap, "SmartCapEVO". Accessed Oct. 13, 2022. < http://www.na.rsismartcap.com>.
RSi SmartCap. "Bed Replacement System." Accessed Oct. 13, 2022. <http://www.na.rsismartcap.com>.
International Search Report of PCT/US2022/038518 dated Oct. 25, 2002.
Written Opinion of PCT/US2022/038518 dated Oct. 25, 2002.
RSi SmartCap, "SmartCapEVO". Published Jan. 22, 2021. Accessed Oct. 13, 2022. <http://web.archive.org/web/20210122140515/https://www.na.rsismartcap.com/>.
RSi SmartCap. "Bed Replacement System." Published Mar. 5, 2021. Accessed Oct. 13, 2022. <http://web.archive.org/web/20210305075739/https://www.na.rsismartcap.com/products/smarttray>.

* cited by examiner

34

88

76

84

74

34

32

84

42

PRESSURE LEVER LOCK

BACKGROUND

The present disclosure generally relates to a pressure lever lock. Pressure lever locks, also known as pressure lever latches and compression lever latches, are used in a variety of applications, such as in vehicle canopy doors, trailer doors, generator canopies, cabinets and other enclosures. It should be appreciated that embodiments of the disclosure are not limited to a particular application and the description below focuses on vehicle canopies merely to facilitate explanation and understanding.

The Applicant designs and manufactures vehicle canopies and accessories and therefore has significant experience with conventional pressure lever locks which are commonly used in this field. In a conventional pressure lever lock 10 for a vehicle canopy, an example of which is shown in FIGS. 1 and 2, a spring biased lever 12 is pivotably mounted on a housing 14. The housing 14 is shaped to be secured in an opening formed in a panel of a 25 hinged door, e.g. a side or rear door of the vehicle canopy. In use, the lock 10 can be mounted to the panel of the door, which is configured to be opened and closed over an opening in a door frame.

The lever 12 is held in a closed position, as it is shown in FIGS. 1 and 2, by a catch (not shown) located in the housing 14 that engages a hook (not shown) at one end of the lever 12. In the closed position, the lever 12 is prevented from moving with the spring bias and the hook is concealed in the housing 14.

The lock 10 is fitted with a lock barrel 16 which is located on the lever 12 and can be rotated between a locked position and an unlocked position using a key. The lever 12 is movable from the closed position into an open position using a trigger button 18, movement of which causes movement of the hook. The trigger button 18 can only be actuated when the barrel 16 is in the unlocked position.

With the barrel 16 in the locked position, the hook on the lever 12 is retained by the catch inside of the housing 14 and the button 18 cannot be depressed, thus keeping the lever 12 in the closed position in which a latching arm 20 thereof presses against the door frame to keep the panel of the door closed. In this position, top surfaces of the barrel 16 and button 18 are flush with a top surface of the housing 14. However, with the barrel 16 in the open position, pressing the button 18 displaces the hook such that it is released from the catch, causing the lever 12 to move with the spring bias into the open position. This causes rotation of both the latching arm 20 and the other section of the lever 12 which includes the barrel 16, the button 18 and the hook, as indicated by the rotational arrows "R" in FIG. 2.

While pressure lever locks as shown in FIGS. 1 and 2 are widely used, the Applicant has identified a number of drawbacks when using them, two of which are mentioned below.

Firstly, pressure lever locks such as the one shown in FIGS. 1 and 2 cannot be opened from the inside, e.g. when installed in a vehicle canopy with the barrel 16 located on the outside of the canopy, a person locked in the canopy is not able to open the relevant door.

Secondly, the barrel 16 and/or the button 18 do not provide a seal and thus allow liquid to enter the housing 14. This is undesirable for a number of reasons, including the possibility of liquid entering the vehicle canopy or damaging internal components of the lock 10 itself, as well as the possibility of the liquid freezing inside of the lock 10 and rendering the lock 10 temporarily unusable.

The present disclosure aims to address these and/or other issues, at least to some extent.

SUMMARY

The present disclosure generally relates to a pressure lever lock. In an example, a lock includes an internal facing portion and an external facing portion, a lever assembly, a housing cover on the external facing portion of the lock including a lock assembly having a locked position and an unlocked position and a button cap. The button cap extends into a first groove of the housing cover and engages a silicon sleeve sealing the button cap and the housing cover. A housing includes a trigger button and an inner seal to engage a second groove sealing the housing and the housing cover, and an anchoring frame on the internal facing portion of the lock coupled to the housing. The trigger button extends through the anchoring frame, and the trigger button is accessible from the internal facing portion of the lock to releasably actuate the lock assembly.

In an example, the lock is movable between an open position and a closed position. In the closed position, a panel to which the lock is mounted is closed over an opening in a door frame. The panel and the lock are locked to the door frame because the screw cap of the lever assembly bears against an inside surface of the door frame and is locked in a fixed position. A suitable tool/key may be inserted into the opening of the lock barrel and rotated thereby unlocking the barrel and push button. Specifically, the bottom of the lock barrel will now fit into a groove, allowing the push button to be pushed down. As the push button is depressed, it interferes with a hook of the trigger button and pushes the trigger button away, i.e. open. As the trigger button opens it releases from the striker plate. The spring then pushes the housing cover open which in turn rotates the lever assembly into the open position as shown in the drawings. In other words, the housing cover and the lever assembly pivot together, relative to the housing.

In another example, the lock can be opened from two places. This is achieved through the design and configuration of the trigger button. The trigger button can advantageously be pivoted about the pin to move the lock into the open position irrespective of whether the lock barrel is locked or unlocked.

Additional features and advantages of the disclosed lock are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

3

Figure 1:
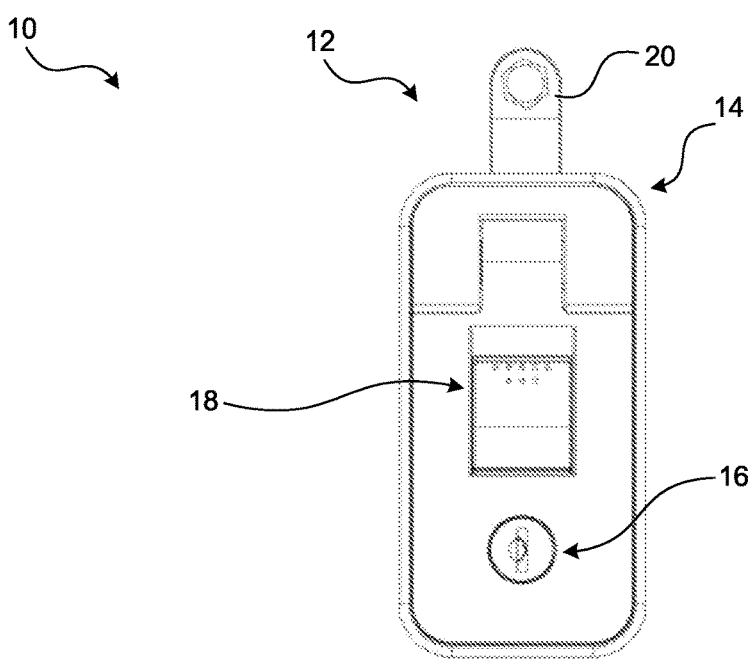
FIG. 1 is a top view of a known pressure lever lock.
Figure 2:
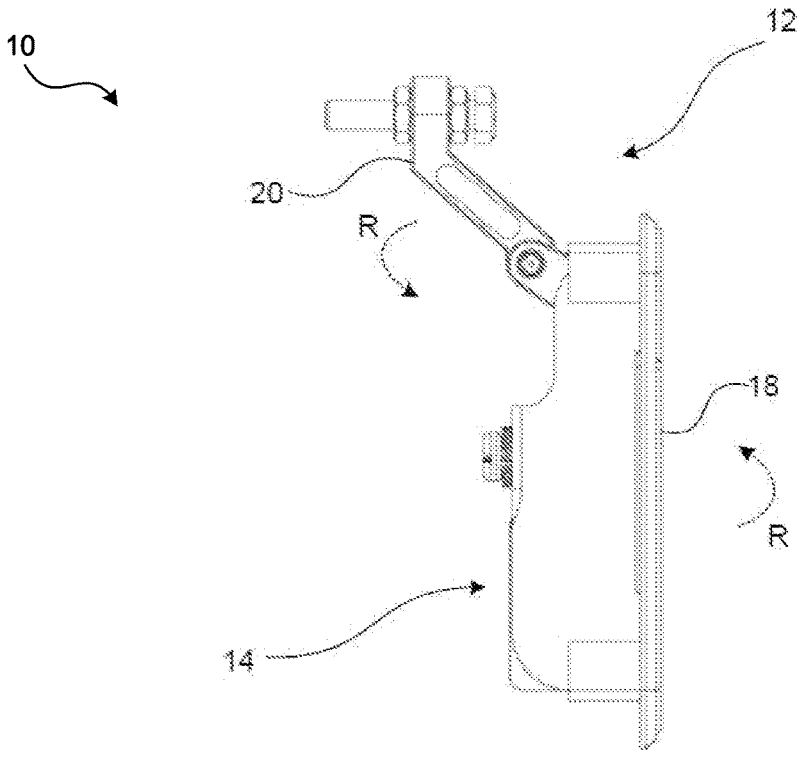
FIG. 2 is a side view of the known lock.
Figure 3:
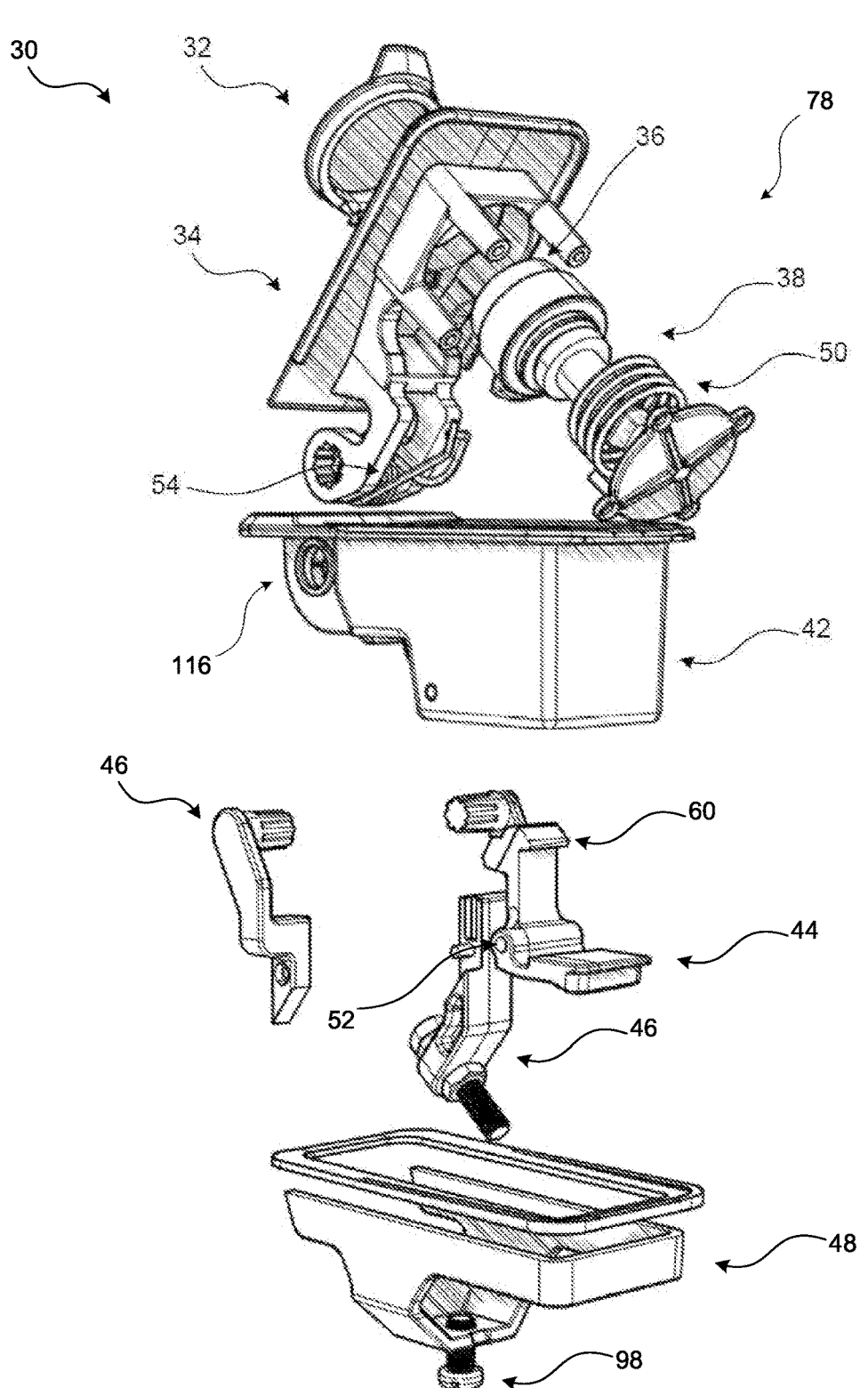
FIG. 3 is an exploded perspective view of an example embodiment of a pressure lever lock according to the present disclosure.
Figure 4:
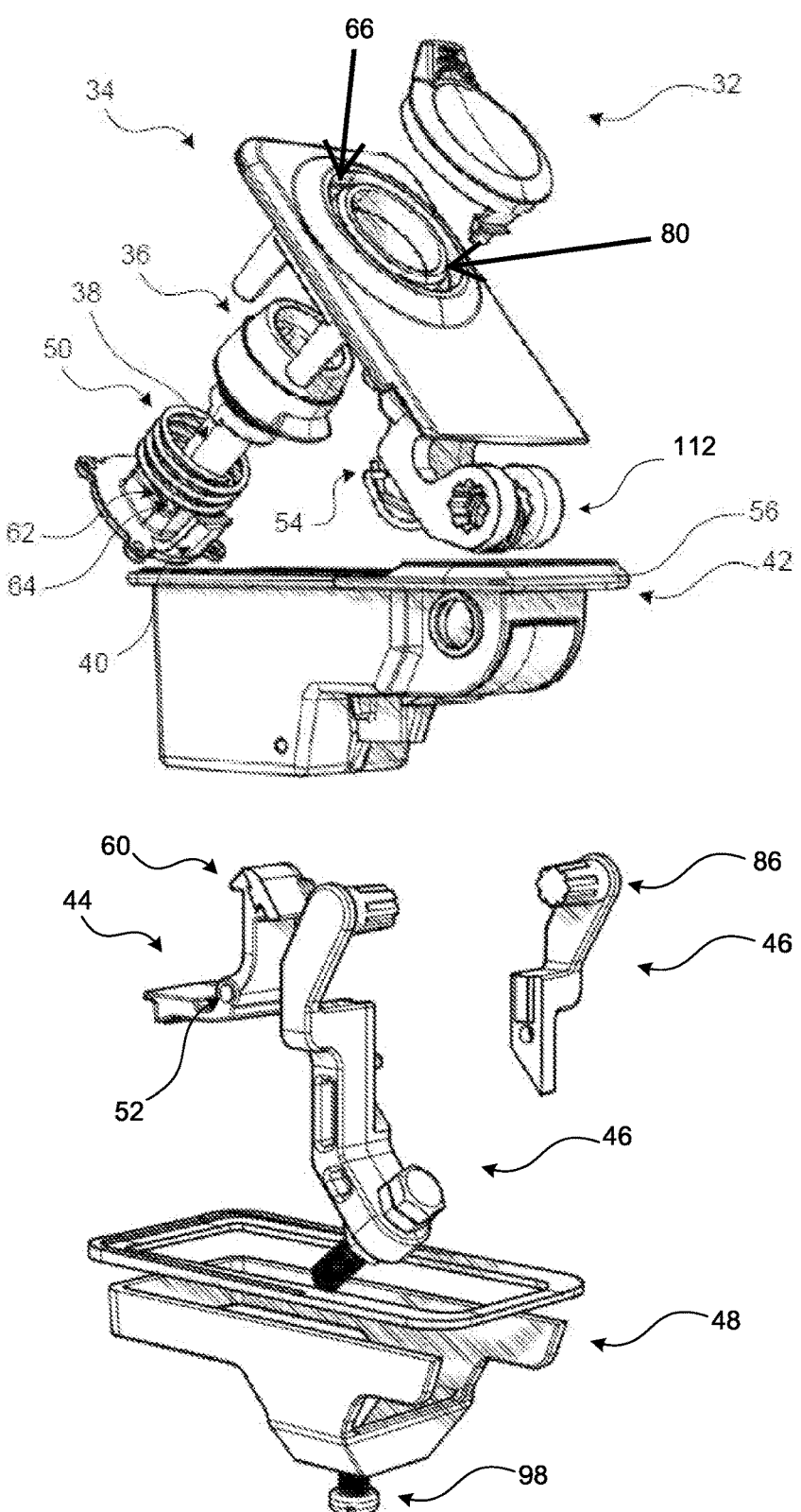
FIG. 4 is an exploded perspective view of an example embodiment of a pressure lever lock according to the present disclosure.
Figure 5:
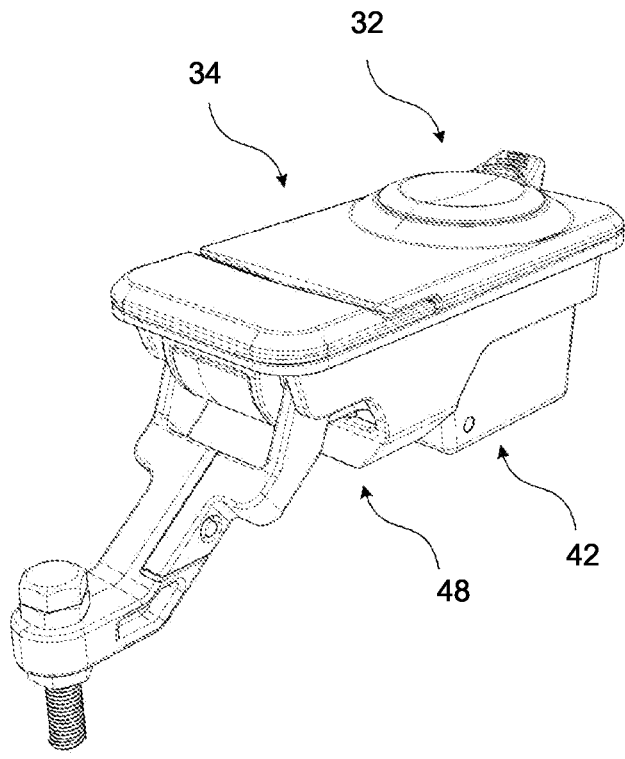
FIG. 5 is another perspective view of an example embodiment of the lock, substantially from the top.
Figure 6:
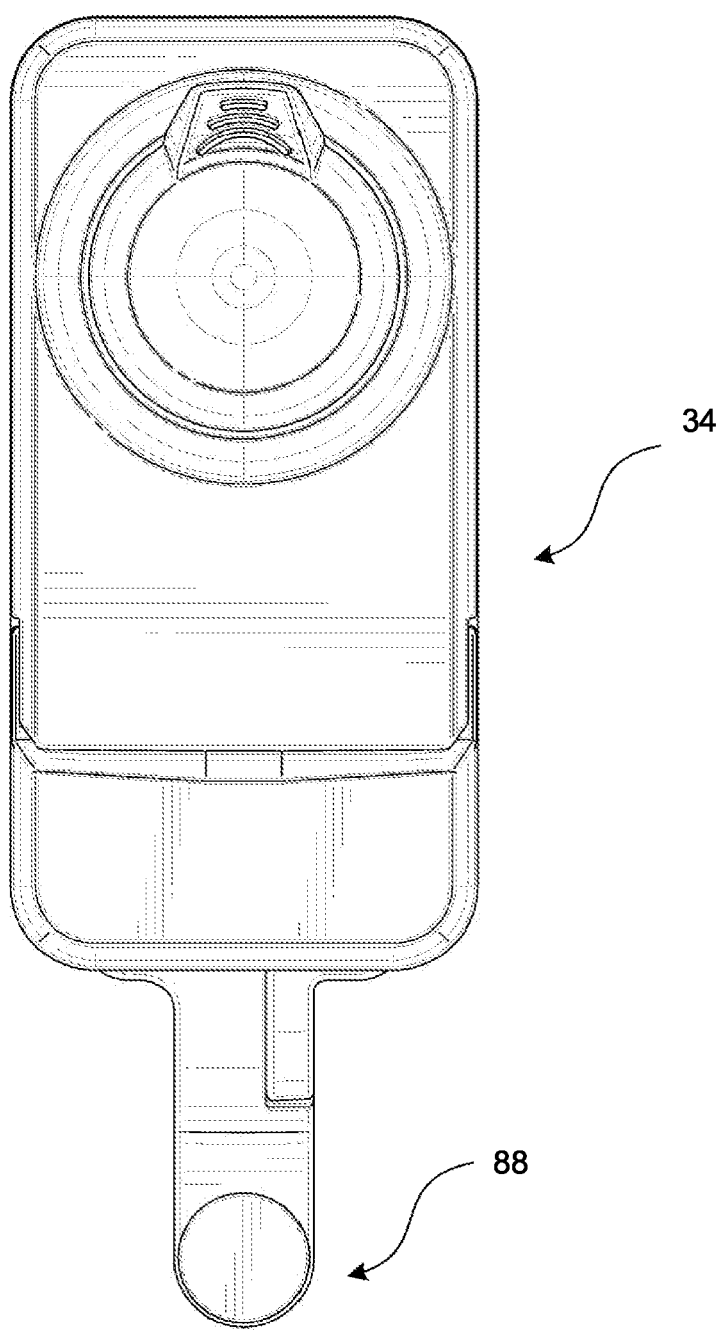
Figure 7:
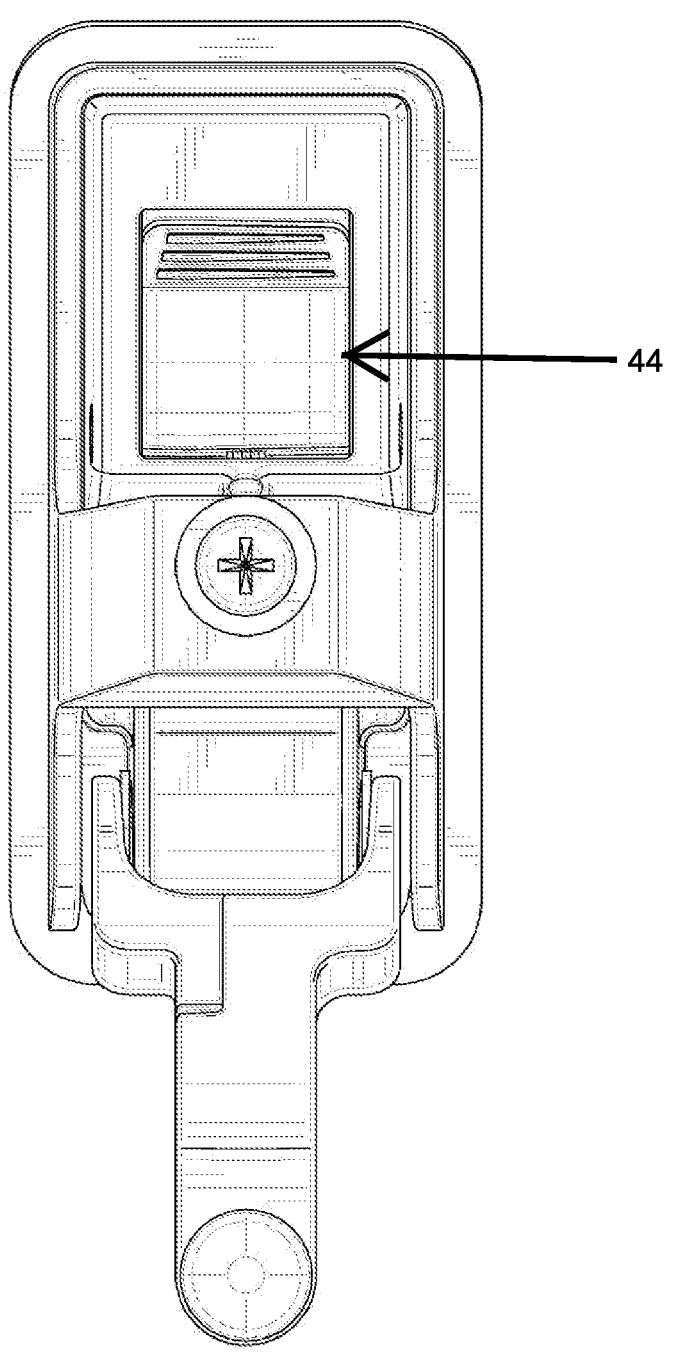
Figure 8:
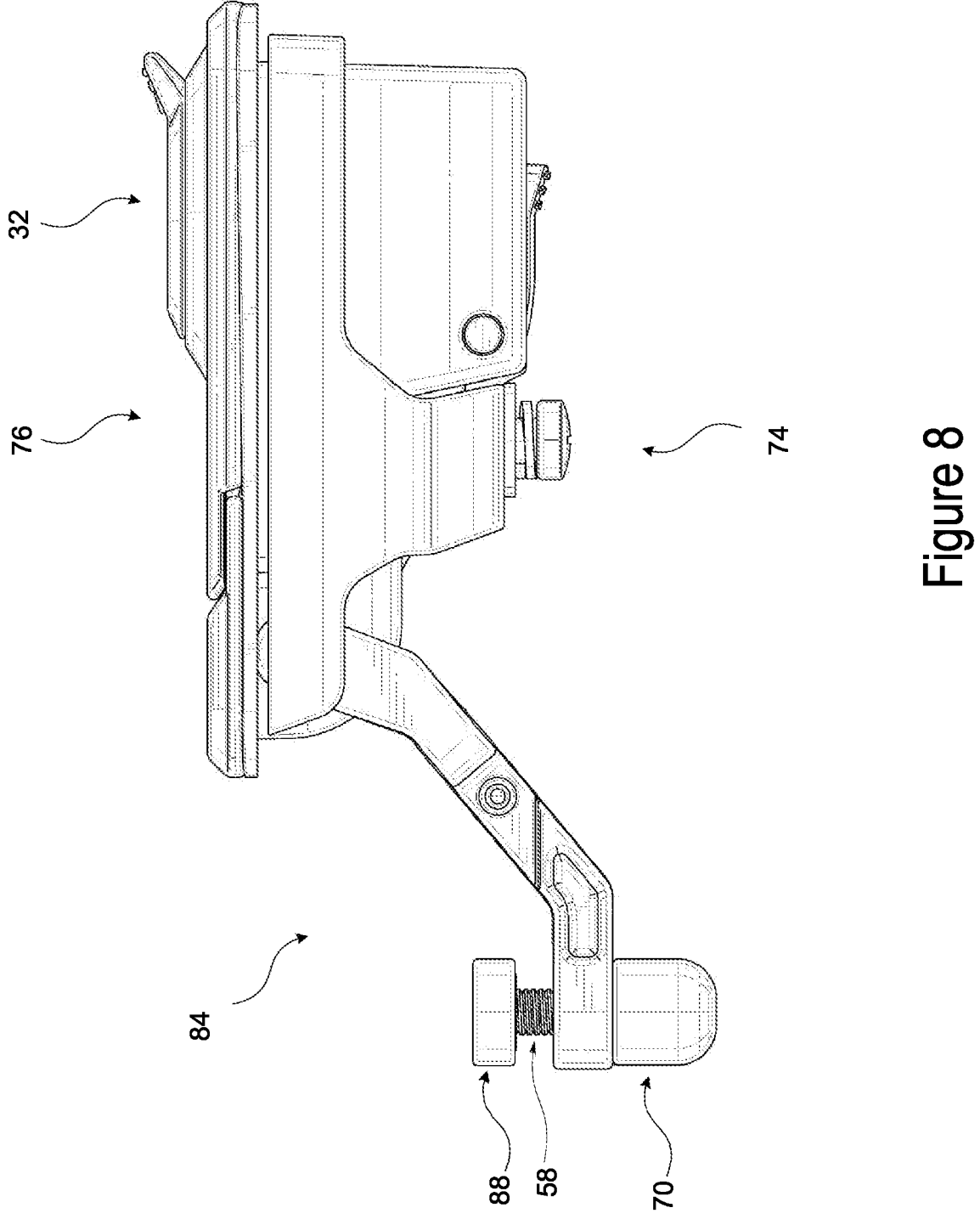
Figure 9:
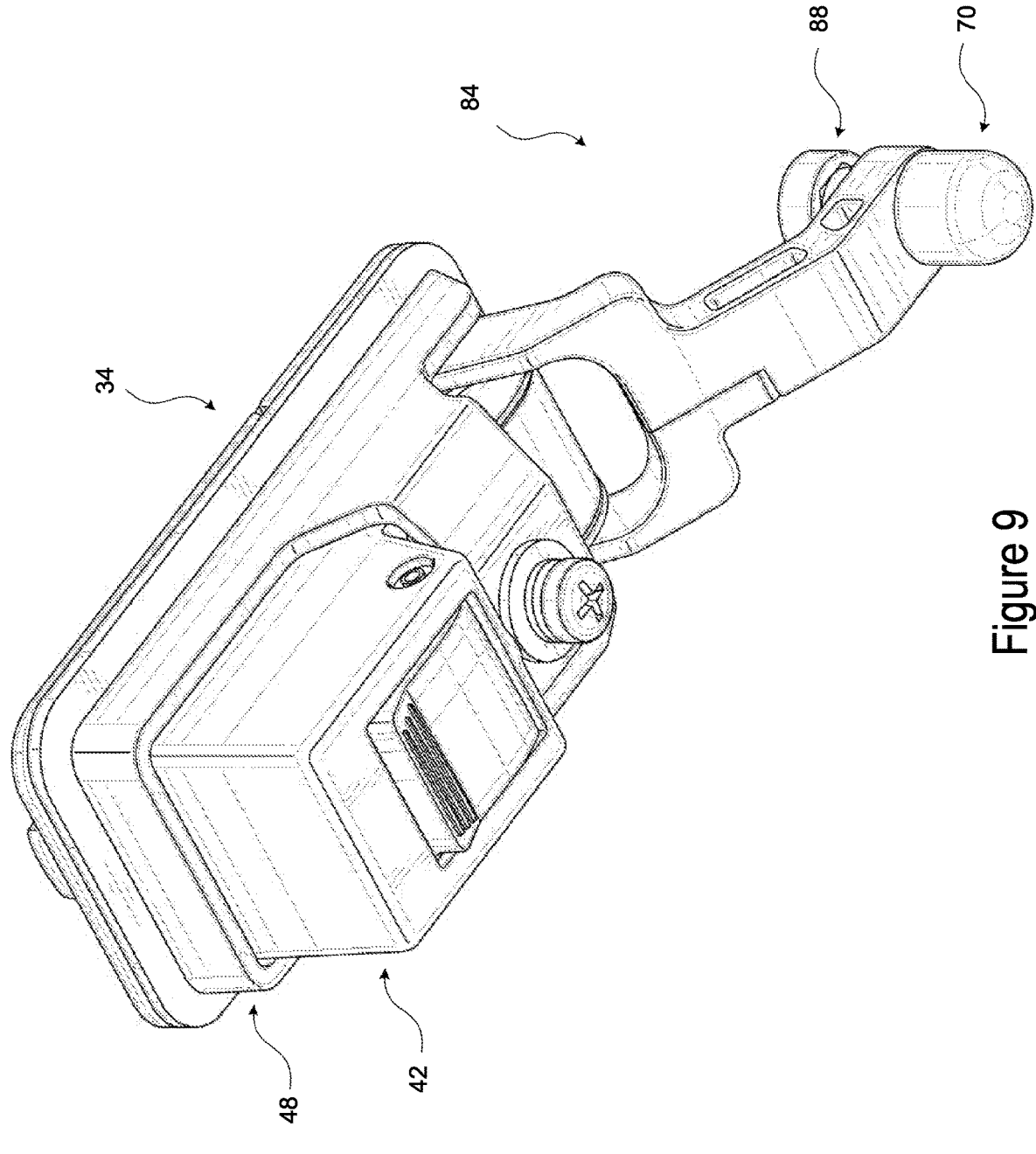
Figure 10:
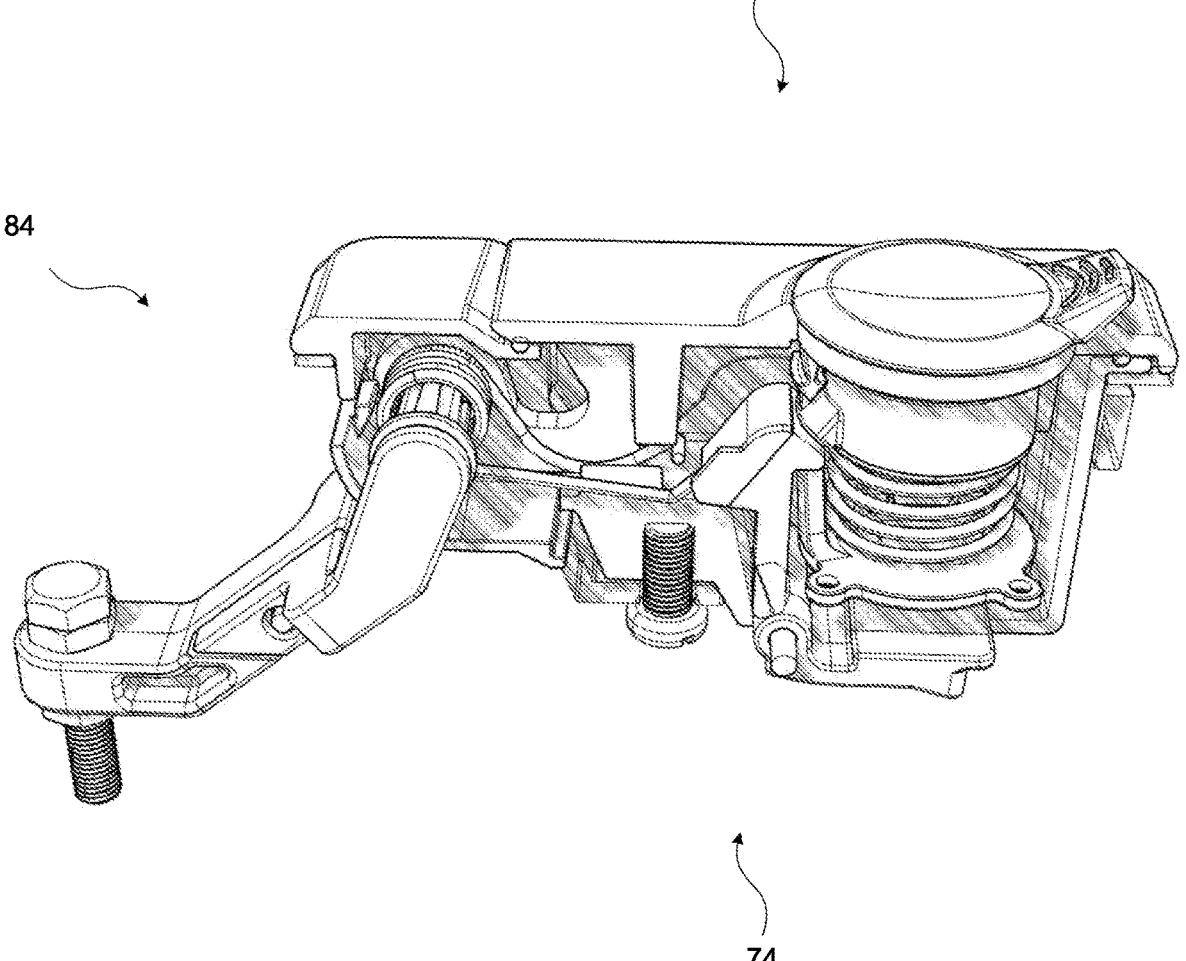
Figure 11:
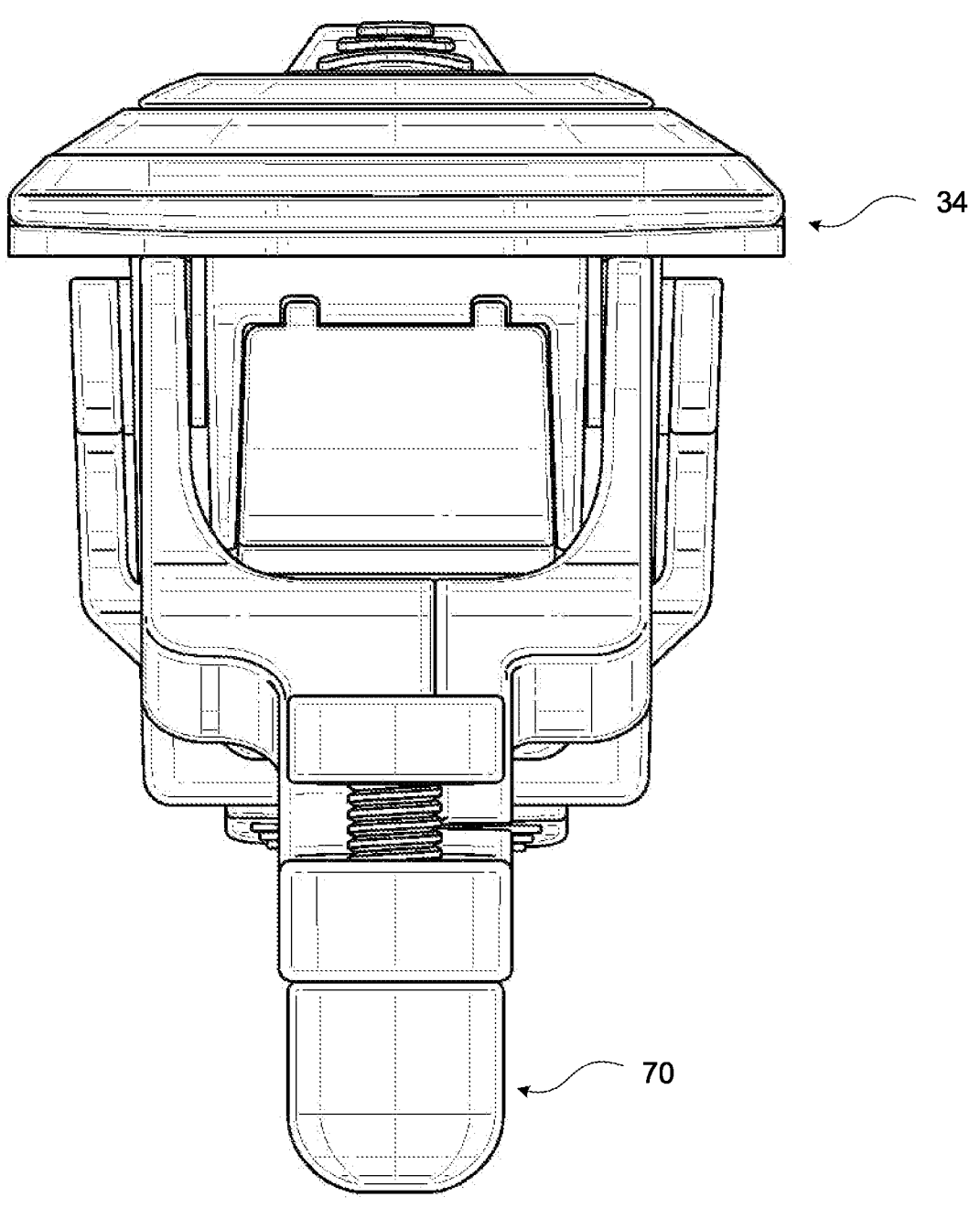
Figure 12:
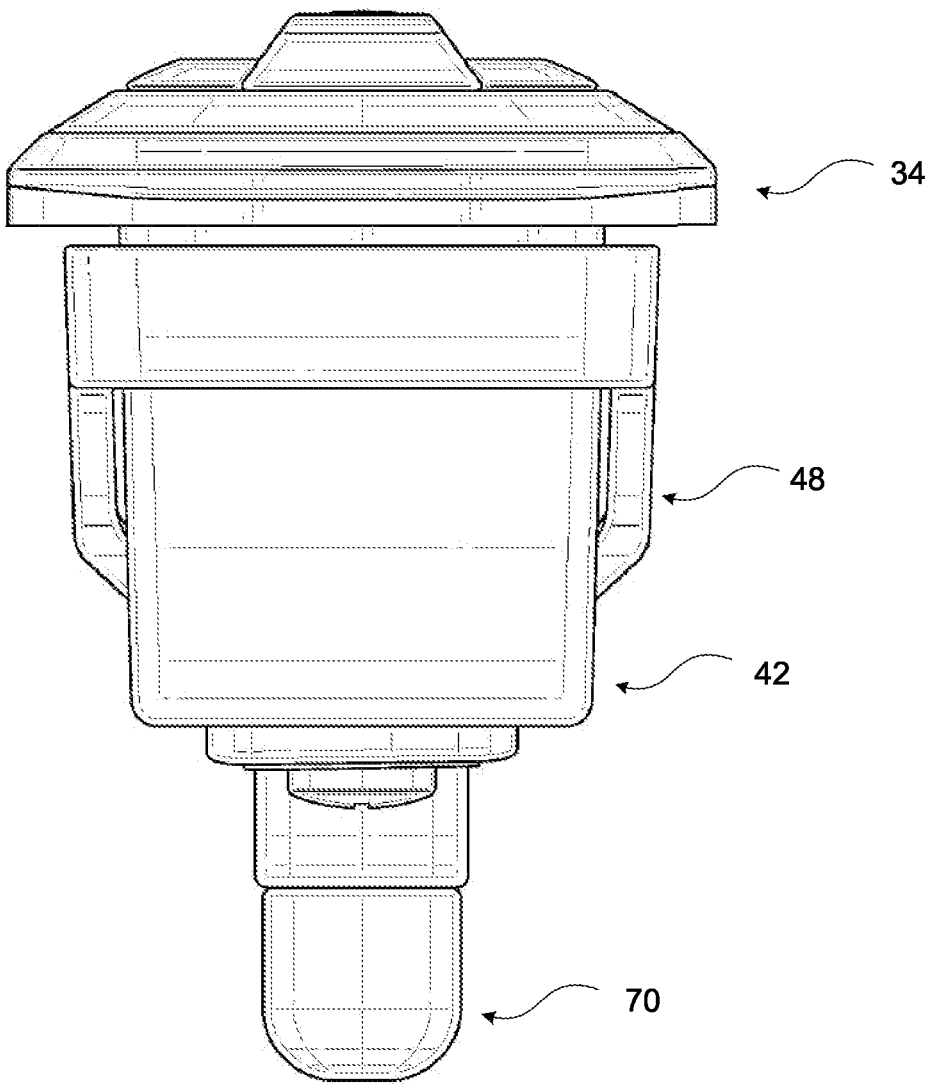
Figure 13:
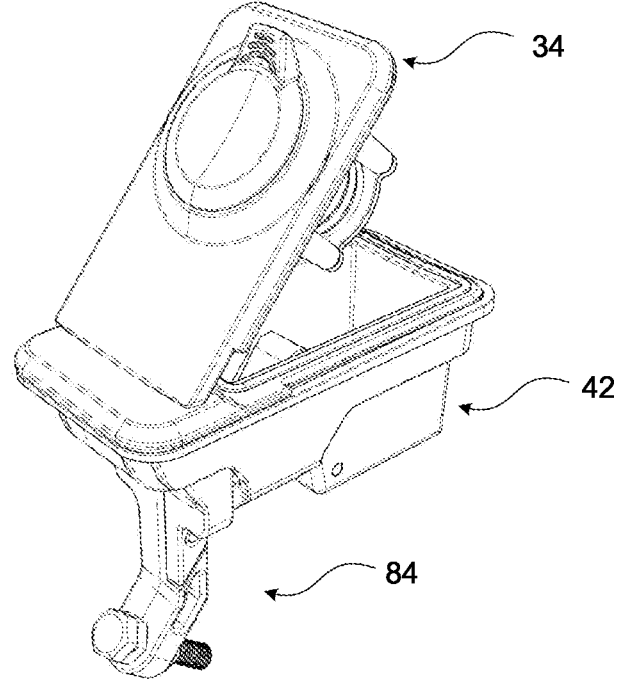
Figure 14:
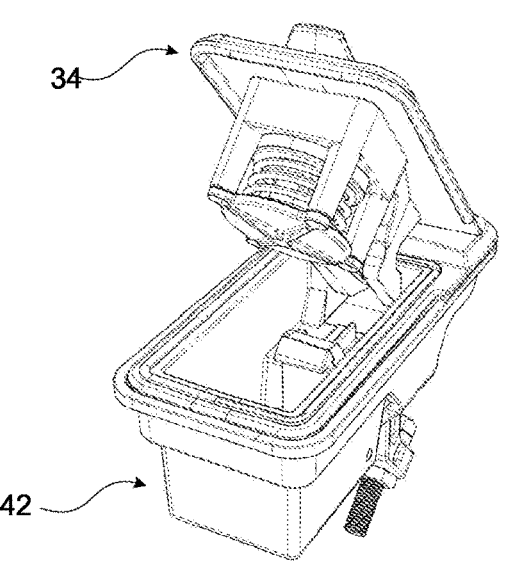
Figure 15:
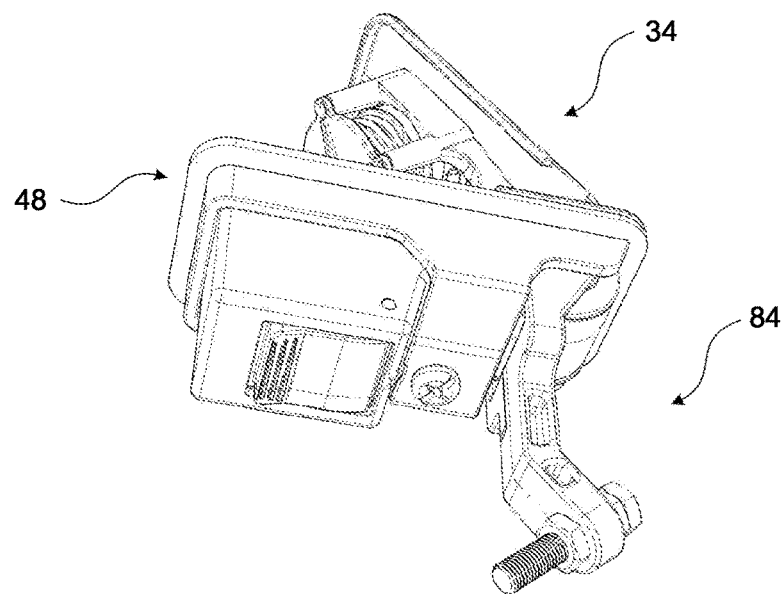
Figure 16:
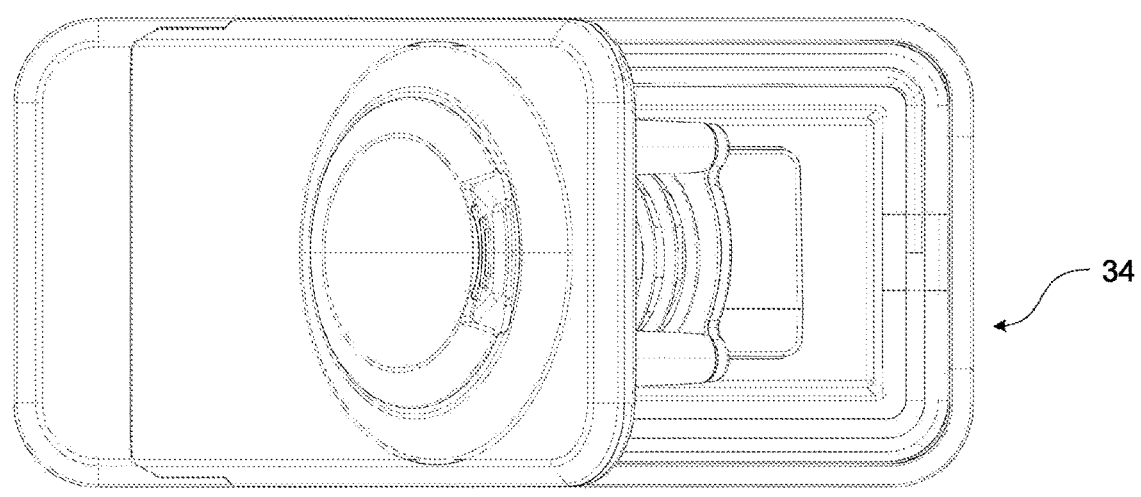
Figure 17:
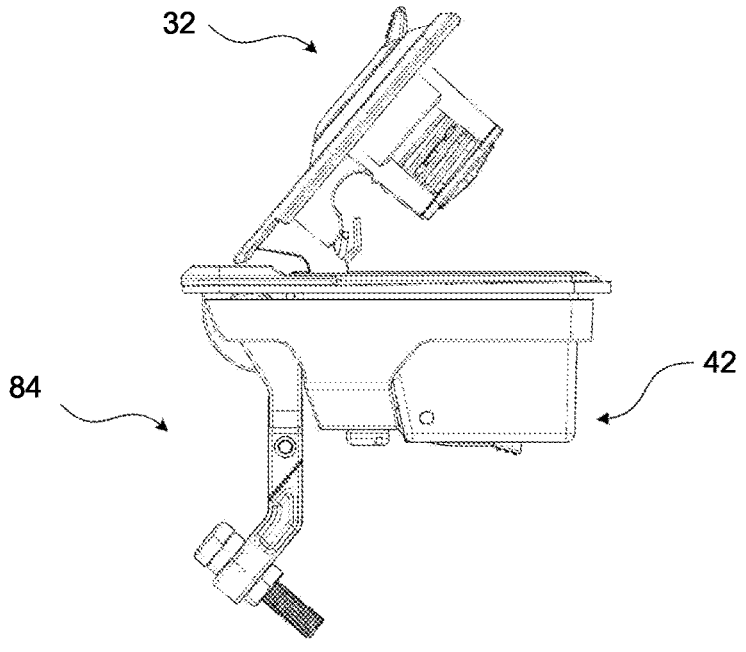
Figure 18:
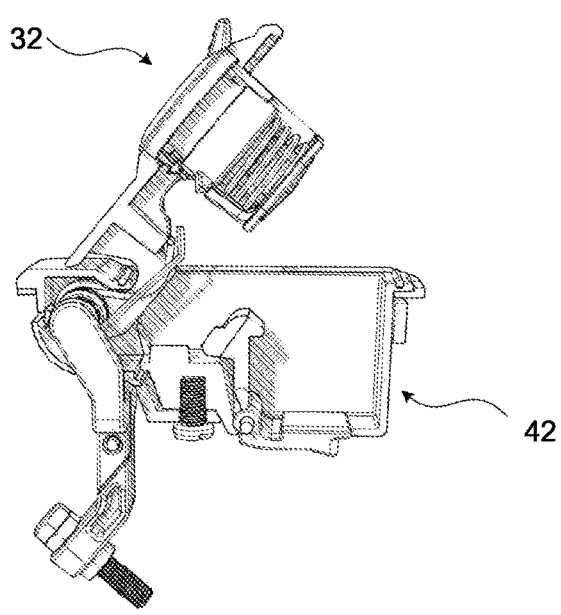
Figure 19:
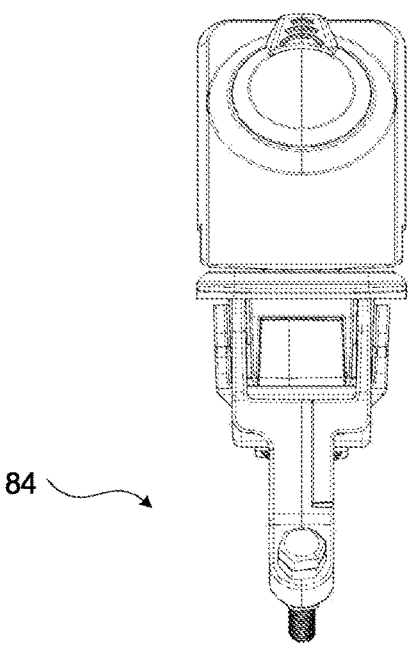
Figure 20:
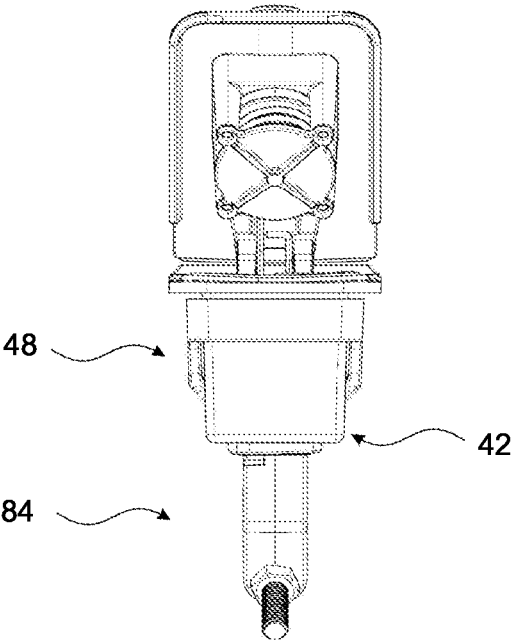
Figure 21:
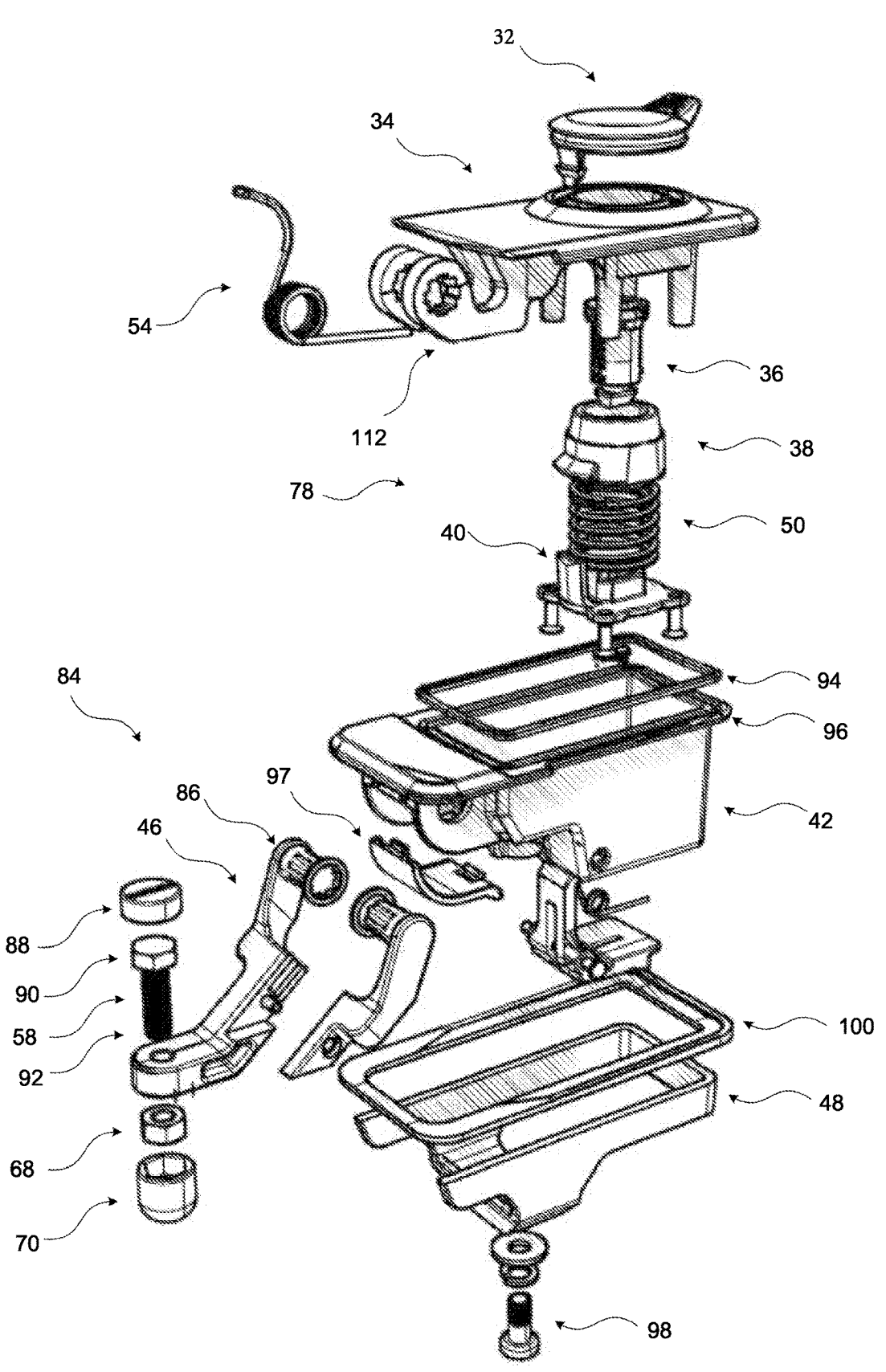
Figure 22:
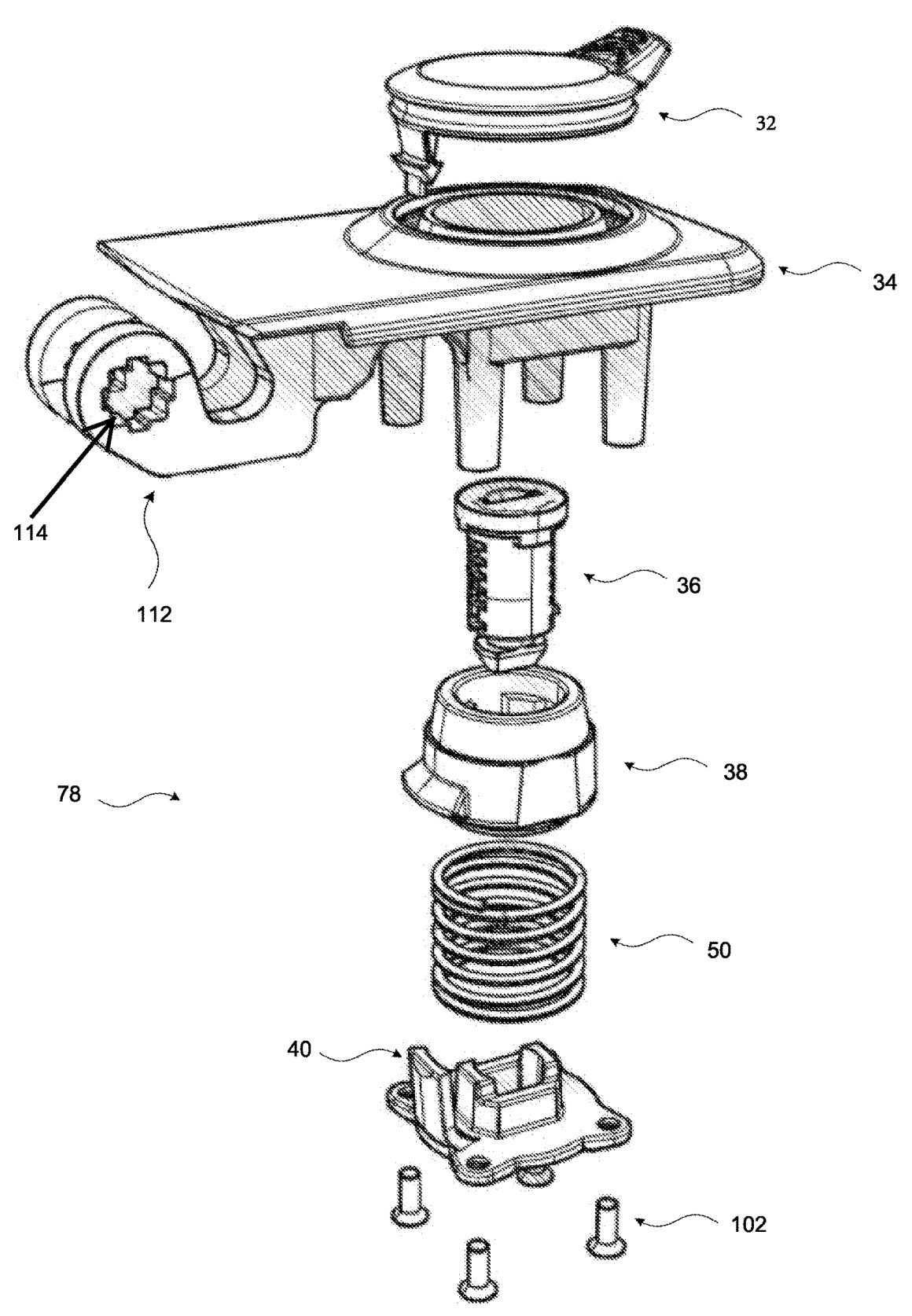
Figure 23:
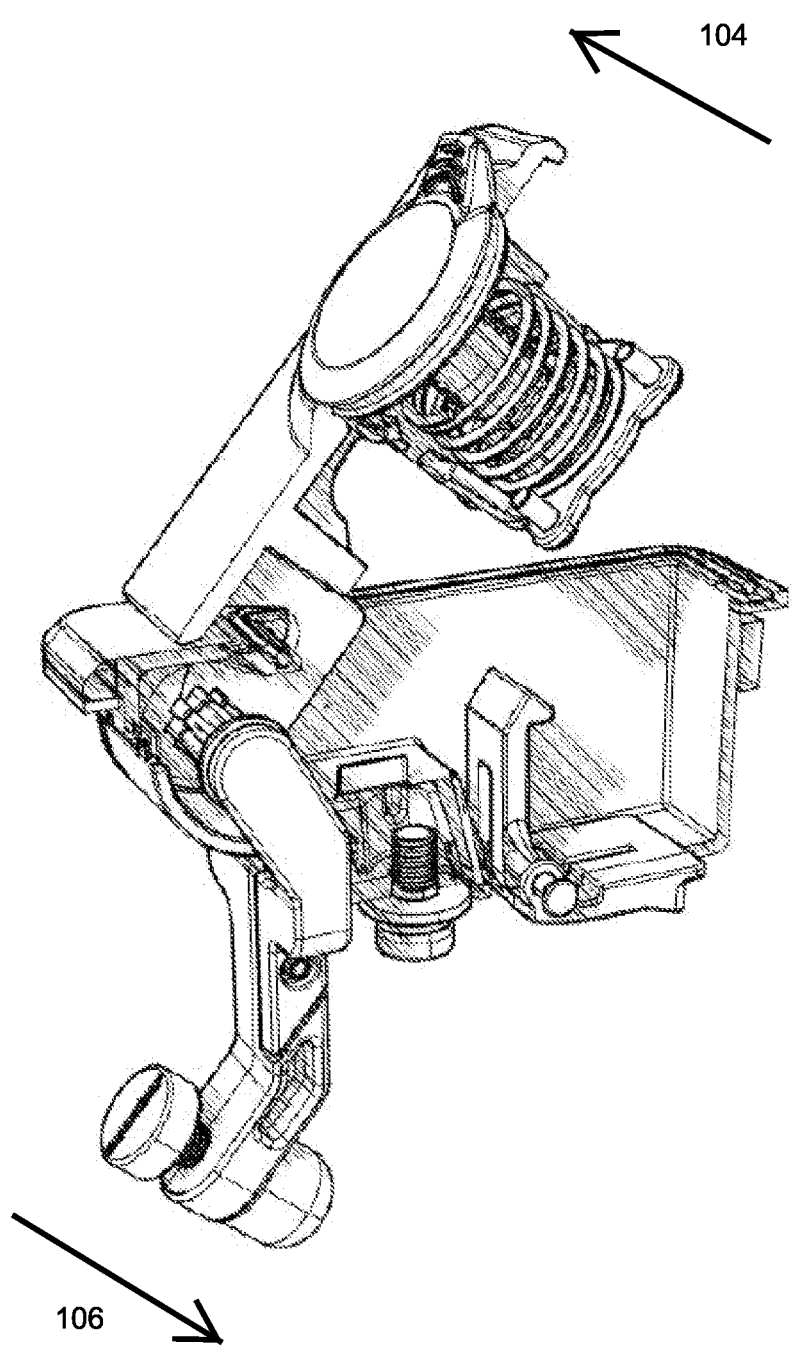
Figure 24:
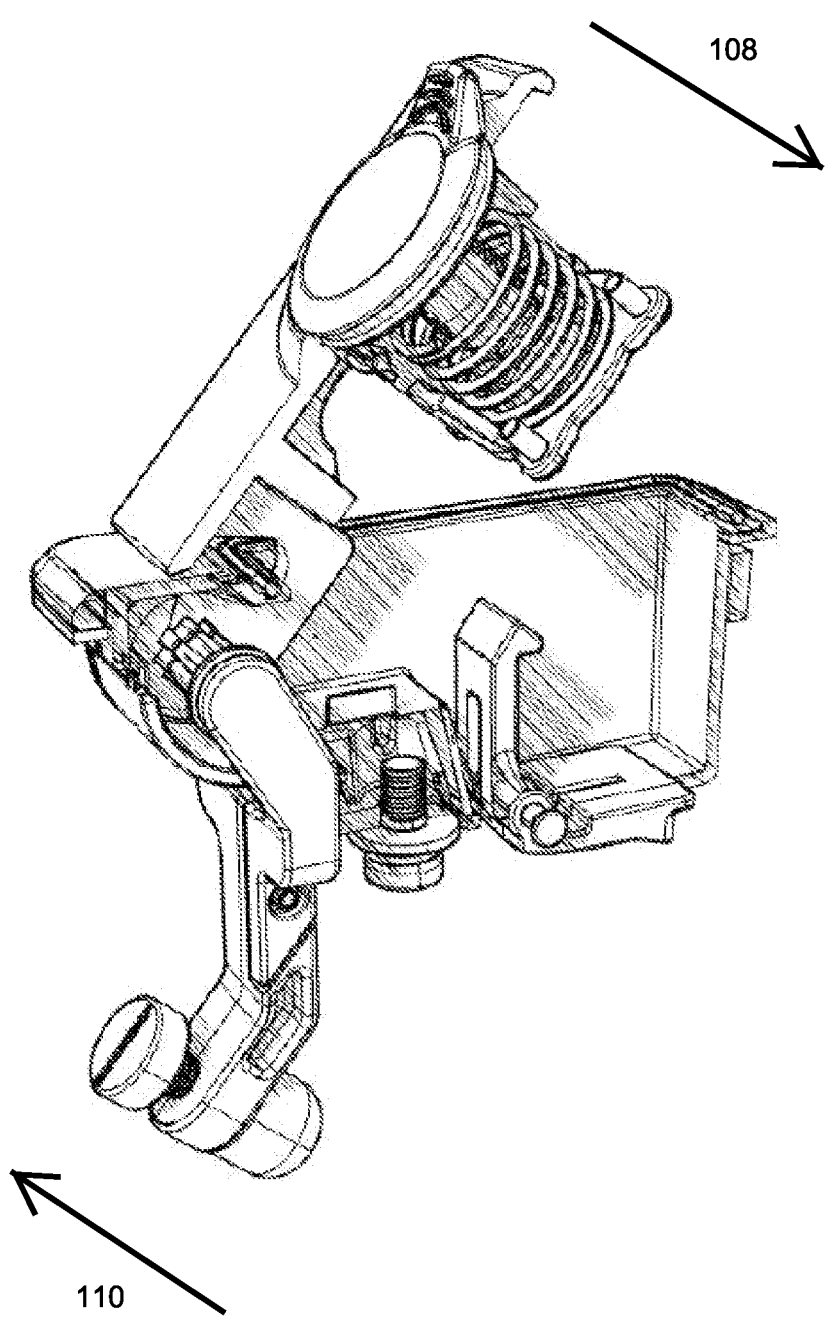

FIG. 6 is a top view of an example embodiment of the lock in the closed position;

FIG. 7 is a bottom view of an example embodiment of the lock in the closed position;

FIG. 8 is a side view an example embodiment of the lock in the closed position;

FIG. 9 is a perspective view of an example embodiment of the lock in the closed position, substantially from the bottom;

FIG. 10 is a partial sectional perspective view of an example embodiment of the lock in the closed position, shown substantially from the top;

FIG. 11 is a front view of an example embodiment of the lock in the closed position;

FIG. 12 is a rear view of an example embodiment of the lock in the closed position;

FIG. 13 is a perspective view of an example embodiment of the lock, substantially from the top, shown in the open position;

FIG. 14 is another perspective view of an example embodiment of the lock, substantially from the top, shown in the open position;

FIG. 15 is a perspective view of an example embodiment of the lock, substantially from the bottom, shown in the open position;

FIG. 16 is a top view of an example embodiment of the lock in the open position;

FIG. 17 is a side view of an example embodiment of the lock in the open position;

FIG. 18 is a partial sectional perspective view of an example embodiment of the lock in the open position, shown substantially from the side;

FIG. 19 is a front view of an example embodiment of the lock in the open position;

FIG. 20 is a rear view of an example embodiment of the lock in the open position;

FIG. 21 is an exploded perspective view of an example embodiment of a pressure lever lock according to the present disclosure;

FIG. 22 is an exploded perspective view of an example embodiment of a pressure lever lock according to the present disclosure;

FIG. 23 is a cross-sectional view of an example embodiment of a pressure lever-lock showing the operation of the pressure lever-lock while opening; and FIG. 24 is a cross-sectional view of an example embodiment of a pressure lever-lock showing the operation of the pressure lever-lock while closing.

DETAILED DESCRIPTION OF EXAMPLE EMBODIMENTS

The following description is provided as an enabling teaching of various example embodiments of the present disclosure, is illustrative of principles associated with the disclosure and is not intended to limit the scope of the claims. Changes may be made to the embodiments depicted and described, while still attaining advantageous results and/or without departing from the scope of the present disclosure. Furthermore, it will be understood that some results or advantages of the presently described example embodiments may be attained by selecting some of the features without utilizing other features. Accordingly, those skilled in the art will recognize that modifications and adaptations to the present disclosure may be possible and may even be desirable in certain circumstances, and the present claims may encompass any such modifications or adaptations.

Broadly, the present disclosure provides an improved pressure lever lock which may offer better sealing and which may be opened from two sides.

An embodiment of a pressure lever lock (hereafter the "lock 30") is shown in FIGS. 3 to 24. The lock 30 may be applied for locking doors of vehicle canopies, but also in other applications as required. As shown in FIG. 8, the lock 30 comprises an internal facing portion 74 and an external facing portion 76.

The lock 30 includes a housing 42, a housing cover 34, and a lock assembly 78. The lock assembly 78 comprises a push button 38 and a lock barrel 36 secured in the push button 38. The push button 38 and the lock barrel 36 are protected and sealed by a button cap 32. In many embodiments, the button cap 32 forms a water-tight seal between the button cap 32 and the housing cover 34. In addition, a top surface of the housing cover 34 can include a silicon sleeve 80 and a first groove 66 for preventing ingress of liquid such as water into the lock 30. Namely, the button cap 32 extends into the first groove 66 and engages the silicon sleeve 80 of the housing cover 34. The water-tight seal between the button cap 32 and the silicon sleeve 80 advantageously allows the lock 30 to provide improved usability and reliability in extreme weather and freezing temperatures by ensuring the lock does not freeze or corrode so as to render the lock inoperable. A user may open the button cap 32 to access the push button 38 and the lock barrel 36 from the external facing portion 76 of the lock 30. Further, a user can actuate the push button 38 without opening the button cap 32. A user may push on the button cap 32, which may actuate the push button 38. The lock assembly 78 further includes a spring 50 held in position by a striker plate 40. The striker plate 40 is secured to the housing cover 34 using a coupling 102, such as four screws in respective corners thereof.

An anchoring frame 48 is used to secure the housing 42 in position, in use. When the lock 30 is secured in position, the housing cover 34 is accessible for the external facing portion 76 of the lock 30. Further, a gasket 100 sits on the exterior of the panel creating an exterior seal between the housing cover 34 and the opening formed in a panel. The housing 42 may comprise an inner seal 94 to engage a second groove 96 sealing the housing 42 and the housing cover 34. In several embodiments, the inner seal 94 may be glued into the second groove 96. Additionally, the housing 42 may further comprise a base pivot cover 97. The base pivot cover 97 may be clipped to the housing 42. The lock 30 further includes a lever assembly 84 comprising an arm 46 having a securing member 86. The lever assembly 84 is fitted to the housing 42 and the housing cover 34 with a spring 54 (such that it is spring loaded). The bias of the spring 54 causes the lever assembly 84 and the housing cover 34 to rotate relative to the housing 42 when the lock is opened.

In several embodiments, the lever assembly 84 and the housing cover 34 may rotate about the securing member 86. The securing member 86 may extend through an aperture 116 of the housing 42 to engage a pivot member 112 of the housing cover 34. In an example, the securing member 86 engages the pivot member 112 by extended into a complementary opening 114 in the pivot member 112. The engagement between the securing member 86 and the complementary opening 114 provide the pivot point whereby the cover housing 34 and the lever assembly 84 rotate about.

Typically the housing 42 is secured in an opening formed in a panel of a hinged door, e.g. a side or rear door of the vehicle canopy, having a door frame. The housing 42 has an outer rim/radial lip 56 which ensures that the lock 30 is held against the outside of the panel while the anchoring frame 48 secures the lock 30 against the inside of the panel, e.g. using the lever assembly 84. In several embodiments, the anchoring frame 48 may be secured to the housing 42 with an anchor screw 98. In an example, the anchor screw 98 may comprise a locking washer. The lever assembly 84 further comprises a closing position adjustment screw 58 having a first end 90 and a second end 92. A screw cap 88 is located on the first end 90 of the closing position adjustment screw 58. A nut 68 and a nut cap 70 are located on the second end 92 of the closing position adjustment screw 58. In many embodiments, the closing position adjustment screw 58 can comprise an M6 Hex Head Set Screw, and the nut 68 can comprise an M6 Nut to engage the closing position adjustment screw 58.

Referring now to operation of the lock 30, the lock 30 is movable between an open position and a closed position as shown in the drawings. In the closed position, the door/panel (not shown) to which the lock 30 is mounted is closed over an opening in a door frame (not shown). The door/panel and the lock 30 are locked to the door frame because the screw cap 88 of the lever assembly 84 bears against an inside surface of the door frame and is locked in a fixed position. In many embodiments, the screw cap 88 can bear on any of a number of interior surfaces other than the surface of the opening panel. In various embodiments, the closing position adjustment screw 58 is adjustable to achieve a flush surface between the door and the door frame. In an example, the closing position adjustment screw 58 is too short, and the panel does not fully close with the lock 30 in the closed position. A user may loosen the nut 68 by rotating the nut cap 70. Once the nut 68 is loose, the user may adjust the length of the closing position adjustment screw 58 by rotating the screw cap 88. The user may rotate the screw cap 88 extending the closing position adjustment screw 58. The user then may retighten the nut 68 fixing the length of the closing position adjustment screw 58. The user may close the panel to determine whether the panel is flush or whether further adjusting is necessary.

A suitable tool/key may be inserted into the opening of the lock barrel 36 and rotated thereby unlocking the lock barrel 36 and push button 38. Specifically, the bottom of the lock barrel 36 will now fit into a groove 62, allowing the push button 38 to be pushed down. As the push button 38 is depressed, it interferes with a hook 60 of the trigger button 44 and pushes the trigger button 44 away, i.e. open. As the trigger button 44 opens it releases from the striker plate 40. The spring 50 then pushes the housing cover 34 open which in turn rotates the lever assembly 84 into the open position as shown in the drawings. In other words, the housing cover 34 and the lever assembly 84 pivot together, relative to the housing 42. While rotating to the open position, the housing cover 34 moves in a direction of arrow 104. The lever assembly 84 moves in a direction of arrow 106.

The lock 30 is specifically designed and configured such that it can be opened from two places (from the top and from the bottom), e.g. from the outside of the vehicle canopy and from the inside when installed as described above. This is achieved through the design and configuration of the trigger button 44. The trigger button 44 can advantageously be pivoted about the pin 52 to move the lock 30 into the open position irrespective of whether the lock barrel 36 is locked or unlocked. In many embodiments, the pin 52 is peened, which may increase the properties of the pin 52.

In use, as the trigger button 44 is pushed in (towards the housing cover 34) from the bottom, the hook 60 releases from the striker plate 40 which in turn causes rotation of the housing cover 34 and the lever assembly 84 into the open position as described above. In the open position the lever assembly 84 no longer bears against any surface and the panel/door can be opened.

To move the lock 30 back to the closed position when the door/panel is closed against the frame, the housing cover 34 is pressed against the bias of the spring 54. This causes the housing cover 34 and the lever assembly 84 to rotate, allowing the screw cap 88 to make contact with the desired target, e.g. the inside of the door frame. While rotating to the closed position, the housing cover 34 moves in a direction of arrow 108. The lever assembly 84 moves in a direction of arrow 110. The housing cover 34 is moved until the striker plate 40 makes contact with the trigger button 44 and is caught and held captive by the hook 60. This secures the cover 34 and the lever assembly 84 in position, with a top of the cover 34 substantially flush with a top of the housing 42.

To lock the lock 30, the key is inserted into the barrel 36 once more and the barrel 36 is rotated such that the bottom of the barrel 36 fits into a seat 64, preventing the push button 38 from being pushed down to release the striker plate 40 from the trigger button 44. Importantly, even in this position the lock 30 can still be opened from the inside using the button 44.

The invention is claimed as follows:

1. A lock comprising:
an internal facing portion and an external facing portion;
a lever assembly;
a housing cover on the external facing portion of the lock comprising a lock assembly, the lock assembly comprising a push button and having a locked position blocking actuation of the push button and an unlocked position allowing actuation of the push button, the housing cover further comprising a button cap, wherein the button cap extends into a first groove of the housing cover and engages a silicon sleeve sealing the button cap and the housing cover;
a striker plate secured to the housing cover, wherein the lock assembly is secured between the housing cover and the striker plate;
a housing comprising a trigger button and an inner seal to engage a second groove sealing the housing and the housing cover; and
an anchoring frame on the internal facing portion of the lock coupled to the housing,
wherein the trigger button extends through the anchoring frame,
wherein the trigger button is accessible from the internal facing portion of the lock to releasably actuate the lock assembly,
wherein the trigger button includes a hook configured to engage with the striker plate,
wherein, in response to actuation of the push button, the push button actuates the trigger button, releasing the hook from the striker plate.
2. The lock of claim 1, wherein the lever assembly comprises:
an arm having a securing member extending through the housing to engage the housing cover, wherein the lever assembly is configured to rotate about the securing member.

3. The lock of claim 2, wherein the lever assembly further comprises a closing position adjustment screw having a first end and a second end, wherein the closing position adjustment screw comprises a screw cap on the first end, a nut, and a nut cap on the second end.

4. The lock of claim 1, wherein the housing cover further comprises a spring configured to rotate the housing cover and the lever assembly.

5. The lock of claim 4, wherein the spring is a torsion spring.

6. The lock of claim 1, wherein the seal between the button cap and the housing cover is water-tight.

7. The lock of claim 1, wherein the seal between the housing cover and the housing is water-tight.

8. The lock of claim 1, wherein the housing further comprises a base pivot cover.

9. The lock of claim 1, wherein a locking washer couples the anchoring frame to the housing.

10. The lock of claim 1, wherein in response to the actuation of the push button, the housing cover and the lever assembly rotate.

11. The lock of claim 1, wherein the lock assembly further comprises:
    a lock barrel;
    a push button spring; and
    a coupling to couple the lock assembly to the housing cover.

12. The lock of claim 11, wherein the lock barrel is configured to rotate to alter the configuration of the push button between the locked position and the unlocked position.

13. The lock of claim 1, wherein the trigger button releasably actuates the lock assembly in the unlocked position of the push button.

14. The lock of claim 1, wherein the trigger button is spring-loaded and a trigger button pin couples the trigger button to the anchoring frame.

* * * * *